J. S. HECHT AND A. T. DOWDELL.
MANUFACTURE OF OBTURATOR RINGS.
APPLICATION FILED JUNE 28, 1917.
1,303,896.
Patented May 20, 1919.
2 SHEETS—SHEET 1.
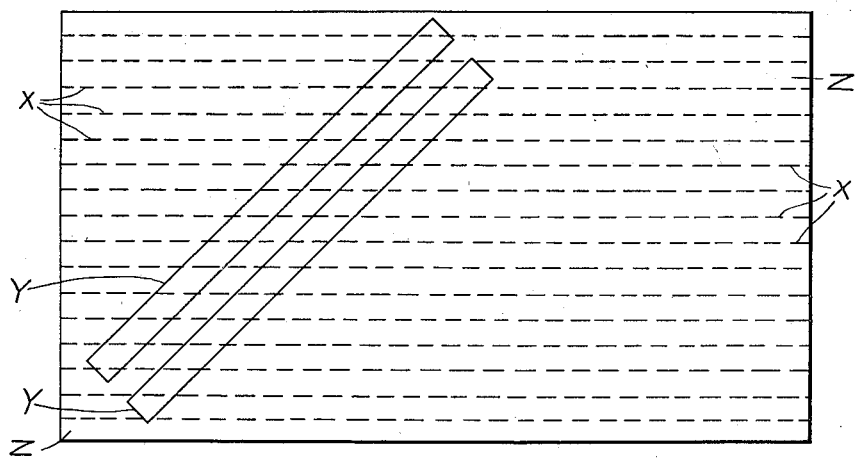
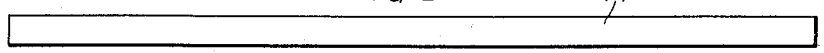
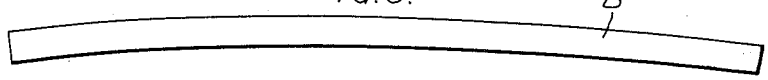
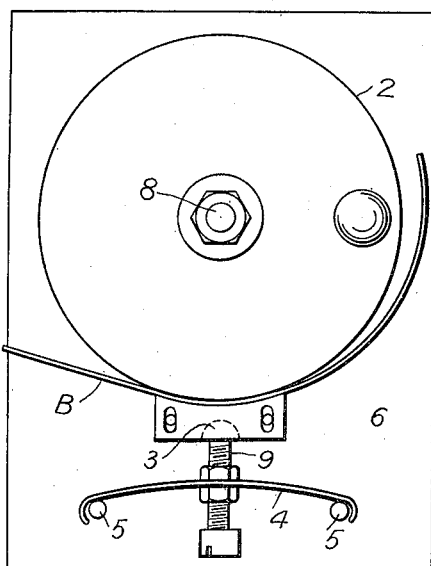
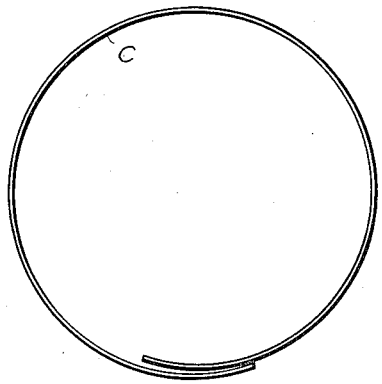
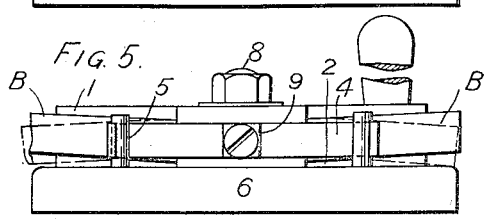
Inventors
John Sebastian Hecht and
Albert Thomas Dowdell
By
Their Attorney

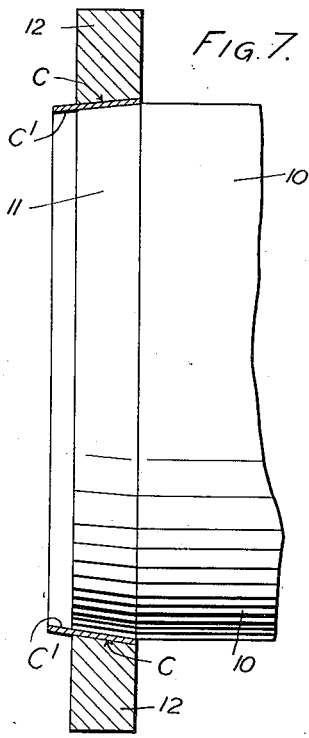
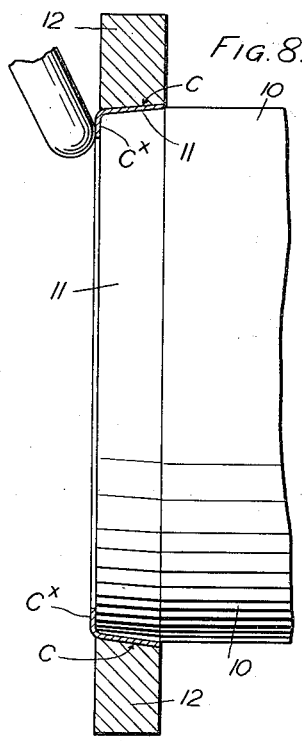
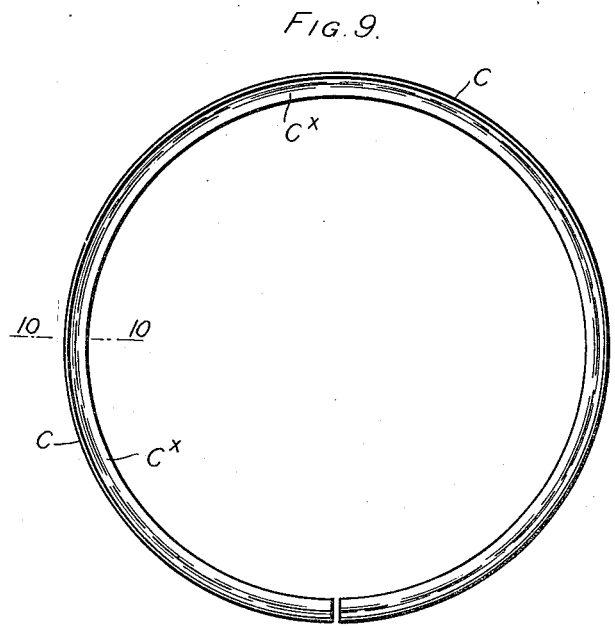
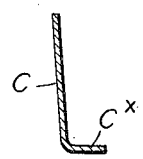

UNITED STATES PATENT OFFICE.

JOHN SEBASTIAN HECHT AND ALBERT THOMAS DOWDELL, OF ST. ALBANS, ENGLAND.

MANUFACTURE OF OBTURATOR-RINGS.

1,303,896.      Specification of Letters Patent.      Patented May 20, 1919.

Application filed June 26, 1917. Serial No. 177,515.

*To all whom it may concern:*

Be it known that we, JOHN SEBASTIAN HECHT, a subject of the King of Great Britain, residing at The Sphere Engineering Works, St. Albans, England, and ALBERT THOMAS DOWDELL, a subject of the King of Great Britain, residing at The Sphere Engineering Works, St. Albans, England, have invented certain new and useful Improvements in or Relating to the Manufacture of Obturator-Rings, of which the following is a specification.

This invention has for its object improvements in or relating to the manufacture of split obturator rings of the kind used in some well known types of internal combustion engines. These rings usually have a section approximately L shaped. The horizontal flanged part of the ring is internal and fits closely into a groove provided in the piston while the upright exterior part or exterior wall of the ring—forming a portion of an acute inverted cone—bears at its upper extremity against the cylinder wall, provision being made for an outward spring of the ring into contact therewith. The pressure of explosion or compression takes place upon the hollow side or inside wall of the ring so assisting in the maintenance of an intimate contact between the upper outside wall or lip of the ring and the cylinder wall.

We will now proceed to further describe the present invention with reference to the accompanying drawings in which—

Figure 1 is a plan view of a metal sheet wherein the direction of the grain of the metal is indicated by the dotted lines $x$, and also indicating by the diagonal lines $y$ the manner of cutting the strip A from such sheet metal diagonally with the grain.

Fig. 2 is a plan view (on an enlarged scale) of a straight strip A of sheet metal.

Fig. 3 is a plan view (on same enlarged scale as Fig. 2) of the strip curved edgewise; and this curved strip B (Fig. 3) may either be produced by curving edgewise the straight strip A shown in Fig. 2 or by stamping or cutting out said strip direct in the curved form such as shown in Fig. 3.

Fig. 4 is a plan of a suitable planishing tool for use in carrying out the process according to this invention; and Fig. 5 is an edge view of Fig. 4.

Fig. 6 is a plan view of the curved strip bent flatwise into a ring with the ends overlapping.

Fig. 7 is a detail view of the end of the "former" with the bent strip or ring (Fig. 6) locked thereon with one edge (*i. e.* the edge of smaller diameter) projecting clear of the parts of the "former" *i. e.* before said edge is turned over; while Fig. 8 is a view corresponding to Fig. 7 showing in addition part of a spinning or pressing tool and showing said edge of the ring after it has been spun or pressed over to form the flange or lip on the ring.

Fig. 9 is a plan view of the finished ring with an inwardly projecting flange or lip thereon produced by the process according to this invention.

Fig. 10 is a cross sectional view (on an enlarged scale) on the line 10—10 Fig. 9.

Sheets of metal such as Z Fig. 1 are cut into straight strips A (such as Fig. 2) as aforesaid and preferably cut diagonally of the grain as indicated in Fig. 1 and as described in the specification of our pending application for United States patent filed 17th May, 1916, Series of 1915, No. 98,073. The sheet of metal such as Z from which these strips A are cut are (or advantageously may be) of a thickness greater than the finished thickness of the metal forming the ring and are preferably soft rolled.

The strips A are carefully rolled down to the exact thickness and hardness of metal desired—unless so accurately produced as to render this rolling unnecessary.

The strips A are then formed edgewise to a predetermined curve such as shown in Fig. 3 representing the arc of a circle of a radius from which the cone of the finished ring is derived. This curving process may be advantageously carried out by pressure between convex and concave shaped formers (not shown) the strip being held on edge closely between two side plates to prevent as far as possible cockles forming on the concave side of the curved strips.

Any cockles or irregularities of surface formed by this curving process or otherwise present in the strip we remove by passing the curved strip B through what we may term a planishing tool which operates upon the wide portions or sides of the strip B. Preferably for this purpose we employ a planishing tool of the type or character illustrated in Figs. 4 and 5 and comprising a wheel 1 with a flat face 2 (*i. e.* the periphery of which is flat crosswise) on which a curved shoe 3 bears by spring action *e. g.* by means of the spring 4 bearing at the points 5 on the support 6 on which the wheel 1 is pivoted at 8; the spring 4 acting on the curved shoe 3 through the adjustable rod 9.

The curved shoe 3 makes contact with the circumference of the wheel 1 for a short distance on the latter. The strip B is passed longitudinally between the wheel 1 and curved shoe 3 and is thereby bent to the radius of the wheel 1. A few passes of the metal strip B back and forth through this tool "iron" out any irregularities (cockles or kinks) that may have been formed in the strip B.

Or alternatively to the above the straight strips A may be curved by rolling down with greater pressure on and along one side of the strip so that the metal is expanded along that edge thereby forming a curve to the radius required.

Or again alternatively the curved strip B may be cut or stamped in the desired curved shape or formation direct from the sheet in which latter case the metal sheet may previously be accurately rolled by means of an apparatus similar to that shown in Figs. 4 and 5, or other suitable means.

The curved strip B (now bent into a ring) is then flattened by hand or otherwise (though the edgewise curve is retained) and is then placed in a cutting tool or machine and the ends are cut off or trimmed to the dead length and shape or form required. The strip B is then passed through a bending or curving tool (*e. g.* a tool similar to that shown in Figs. 4 and 5) which operates upon the sides of wide portions of the strip B the object being to bend or curve the strip B upon its wide side or face into a ring C such as shown in Fig. 6 the diameter of which is somewhat smaller than that of the finished ring eventually to be formed therefrom so that the trimmed ends now overlap *e. g.* as shown in Fig. 6. The strip B is therefore of necessity bent or curved upon itself into a ring C because of the metal sheet having been previously rolled as above pointed out.

This bending or curving tool is or may be similarly constructed to the ironing or planishing tool above referred to (*e. g.* as illustrated in Figs. 4 and 5 but with the radius of the wheel 1 and shoe 3 preferably less for this purpose) and curves the strip B throughout its length right to its extreme ends as well as ironing out any further cockles or irregularities.

The next operation consists in placing the strip of metal B (*i. e.* the ring C produced as aforesaid) on a "former" which accurately or approximately representes the diameter of the finished ring. This "former" consists of a male portion 10 and female portion 12.

The male portion 10 is slightly tapered (to the front) at 11 representing the conical formation of the finished ring. The ring C is sprung over this male portion 10 and is suitably located in its position or guided into and located in position on the tapered part 11 by suitable means such as stops on the male portion 10.

The female portion (in the form of a stout ring 12) is also tapered correspondingly to the male part. This female portion or stout ring part 12 fits tightly over the ring C while it is in position on the male part of the "former" and holds the strip in the form of the ring C rigidly in position. When the ring C is so held in the "former" above described a portion of the width of the strip *i. e.* one edge $C^1$ is trimmed in a lathe or by suitable means to remove any superfluous material; and the thus trimmed projecting edge $C^1$ is afterward spun or pressed over inward in any well known manner—such as by the tool 13 shown in Fig. 8—to thereby form the inwardly projecting flange $C^x$ of the ring C; or any other desired angle may be formed on the ring C.

On the removal of the now flanged ring C from this "former" it is approximately of the size for use in the engines. The ring C is now placed and rigidly held in another "former" or equivalent holder but reversed so that the other (top) edge of the ring may have any superfluous metal trimmed off; or may be finished off in any suitable way.

Finally each flanged ring is examined on a gage and if necessary lapped by any suitable method or fitted by hand and lapped so as to insure a contact of the lip of the ring C all around with the cylinder wall when placed on the piston and the latter inserted in the cylinder of the engine.

The finished ring C with inwardly projecting flange $C^x$ therein is illustrated in plan at Fig. 9 and enlarged cross-section at Fig. 10.

In describing the present process with reference to the accompanying drawings we have referred to two modifications of said process namely two alternative methods of obtaining the slightly curved or crescent-shaped strip B in Fig. 3; and in addition other modifications of the process may be made as for example instead of employing a curved strip such as illustrated in Fig. 3 we may employ a long straight strip of sheet metal of greater width than Fig. 2 namely of a width sufficient to ultimately produce an obturator ring without bending said strip edgewise as hereinbefore described. We then roll said straight wide strip and trim the ends if necessary and next bend the strip flatwise around a preliminary male cone into a ring of smaller diameter than that to be imparted to the finished ring. We then mount said ring on the conical male portion of a "former" and place thereover the conical female portion of said "former" in suchwise as to leave the edge part of the ring of smaller diameter projecting clear of said two portions of the "former" and we then trim said projecting edge before turning it over, next spinning or pressing over said projecting edge to thereby form the inwardly extending flange or lip on the ring, and trim the other edge of the ring either before or after removing said ring from the "former."

Or, according to another modification of the hereinbefore described processes of manufacturing obturator rings, we may employ a long narrow strip of sheet metal which is not curved edgewise, and subject said straight strip either to a rolling or planishing action or to a rolling and planishing action, both for the purpose specified and after bending this still straight strip flatwise into a cylindrical ring we then finish said ring on a cylindrical or slightly conical male portion of a "former" in conjunction with a corresponding female portion of said "former."

The above described process of manufacture is applicable in the case where each split obturator ring consists of one or more strips or thicknesses of metal in its construction.

What we claim is:—

1. The herein described process of manufacturing a split metallic obturator ring which consists in forming a long narrow strip of sheet metal, curving said strip edgewise e. g. into the form as shown in Fig. 3, subjecting the curved strip to the action of a planishing tool to thereby "iron" out any irregularities, next bending the strip flatwise into a ring preferably of smaller diameter than that to be imparted to the finished ring, mounting said ring on the conical male portion of a "former" and placing thereover the conical female portion of said "former" in suchwise as to leave that edge of the ring which was the concave edge of the curved strip projecting clear of said two portions of the "former;" trimming said edge, and spinning or pressing over said concave edge to thereby form the inwardly extending flange or lip on the ring, and trimming the other edge of the ring, all substantially as set forth.

2. The herein described process of manufacturing a split metallic obturator ring which consists in forming a long narrow strip of sheet metal rolling said strip to smooth same, curving said strip edgewise e. g. into the form as shown in Fig. 3, subjecting the curved strip to the action of a planishing tool to thereby "iron" out any irregularities trimming the ends, next bending the strip flatwise into a ring preferably of smaller diameter than that to be imparted to the finished ring, mounting said ring on the conical male portion of a "former" and placing thereover the conical female portion of said "former" in suchwise as to leave that edge of the ring which was the concave edge of the curved strip projecting clear of said two portions of the "former;" trimming said edge, and spinning or pressing over said concave edge to thereby form the inwardly extending flange or lip on the ring, and trimming the other edge of the ring, all substantially as set forth.

3. The herein described process of manufacturing a split metallic obturator ring which consists in producing a crescent shaped strip of sheet metal, next bending the strip flatwise into a ring preferably of smaller diameter than that to be imparted to the finished ring, mounting said ring on the conical male portion of a "former" and placing thereover the conical female portion of said "former" in suchwise as to leave that edge of the ring which was the concave edge of the curved strip projecting clear of said two portions of the "former"; and spinning or pressing over said concave edge to thereby form the inwardly extending flange or lip on the ring, and trimming the edges of the ring, all substantially as set forth.

4. The herein described process of manufacturing a split metallic obturator ring which consists in producing a crescent shaped strip of sheet metal, subjecting such strip to rolling action, next bending the strip flatwise into a ring preferably of smaller diameter than that to be imparted to the finished ring, mounting said ring on the conical male portion of a "former" and placing thereover the conical female portion of said "former" in suchwise as to leave that edge of the ring which was the concave edge of the curved strip projecting clear of said two portions of the "former"; and spinning or pressing over said concave edge to thereby form the inwardly extending flange or lip on the ring, and trimming the edges of the ring, all substantially as set forth.

5. The herein described process of manufacturing a split metallic obturator ring which consists in forming a strip of sheet metal by rolling said strip, next bending the strip flatwise around a preliminary male "former" into a ring of smaller diameter than that to be imparted to the finished ring, mounting said ring on the conical male portion of a "former" and placing thereover the corresponding conical female portion of said "former" in suchwise as to leave the edge part of the ring of smaller diameter projecting clear of said two portions of the "former", spinning or pressing over said projecting edge to thereby form the inwardly extending flange or lip on the ring, and trimming the other edge of the ring, substantially as described.

6. The herein described process of manufacturing a split metallic obturator ring which consists in bending the strip flatwise into a ring of smaller diameter than that to be imparted to the finished ring, mounting said ring so as to leave the edged part of the ring projecting clear, and spinning or pressing over said projecting edge to thereby form the inwardly extending flange on the ring.

7. The herein described process of manufacturing a split metallic obturator ring which consists in bending the strip flatwise into a ring of smaller diameter than that to be imparted to the finished ring, mounting said ring so as to leave the edged part of the ring projecting clear, spinning or pressing over said projecting edge to thereby form the inwardly extending flange or lip on the ring and rendering said ring conical before said step of forming said flange or lip.

JOHN SEBASTIAN HECHT.
ALBERT THOMAS DOWDELL.